(12) United States Patent
Choi

(10) Patent No.: US 9,804,402 B2
(45) Date of Patent: Oct. 31, 2017

(54) PORTABLE FOLDING VIRTUAL REALITY DEVICE

(71) Applicant: Hae-Yong Choi, Seoul (KR)

(72) Inventor: Hae-Yong Choi, Seoul (KR)

( * ) Notice: Subject to any disclaimer, the term of this patent is extended or adjusted under 35 U.S.C. 154(b) by 0 days.

(21) Appl. No.: 15/057,260

(22) Filed: Mar. 1, 2016

(65) Prior Publication Data

US 2016/0259170 A1    Sep. 8, 2016

(30) Foreign Application Priority Data

Mar. 4, 2015   (KR) .......................... 10-2015-0030311

(51) Int. Cl.
*G02B 27/04*   (2006.01)
*G02B 25/00*   (2006.01)
*G02B 27/02*   (2006.01)
*G02B 27/01*   (2006.01)

(52) U.S. Cl.
CPC .......... *G02B 27/04* (2013.01); *G02B 25/002* (2013.01); *G02B 27/027* (2013.01); *G02B 27/028* (2013.01); *G02B 27/0172* (2013.01); *G02B 27/0176* (2013.01); *G02B 2027/0127* (2013.01); *G02B 2027/0178* (2013.01)

(58) Field of Classification Search
USPC .................................. 359/800–813, 815–823
See application file for complete search history.

(56) References Cited

U.S. PATENT DOCUMENTS

2015/0103152 A1*   4/2015   Qin ...................... H04N 13/044
                                                                   348/53

* cited by examiner

*Primary Examiner* — Brandi Thomas
(74) *Attorney, Agent, or Firm* — Bacon & Thomas, PLLC

(57) ABSTRACT

A portable folding virtual reality device having a cover formed horizontally; a mounting case which is provided on a front of the cover and on which an image device such as a smart phone is mounted; a lens plate provided with a magnifying lens at a rear of the cover; and a band which is connected to both ends of the lens plate and through which the device is mounted to a head of a user. The mounting case and the lens plate are arranged to form up and downward at a right angle and to rotate by the cover and a front and rear hinges. A supporting plate that rotates left and rightward with respect to a central line of the cover is provided, and the interval between the front hinge and the rear hinge is identical to the focal distance of the left and right magnifying lens.

5 Claims, 8 Drawing Sheets

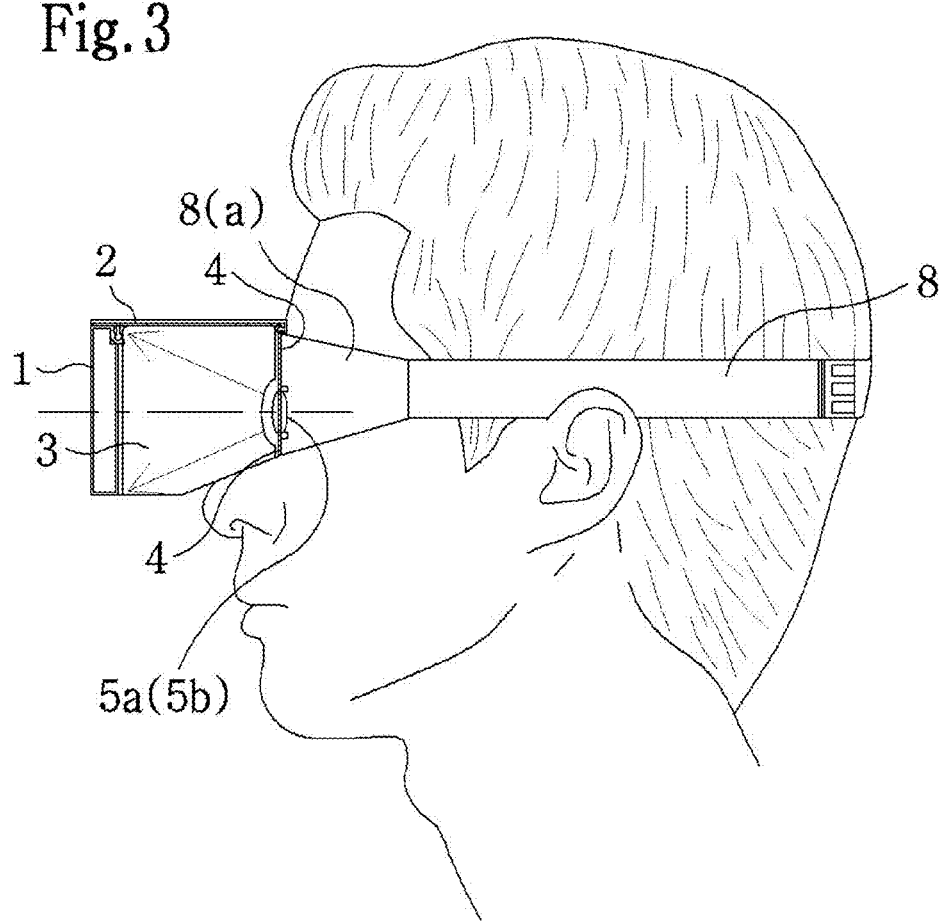

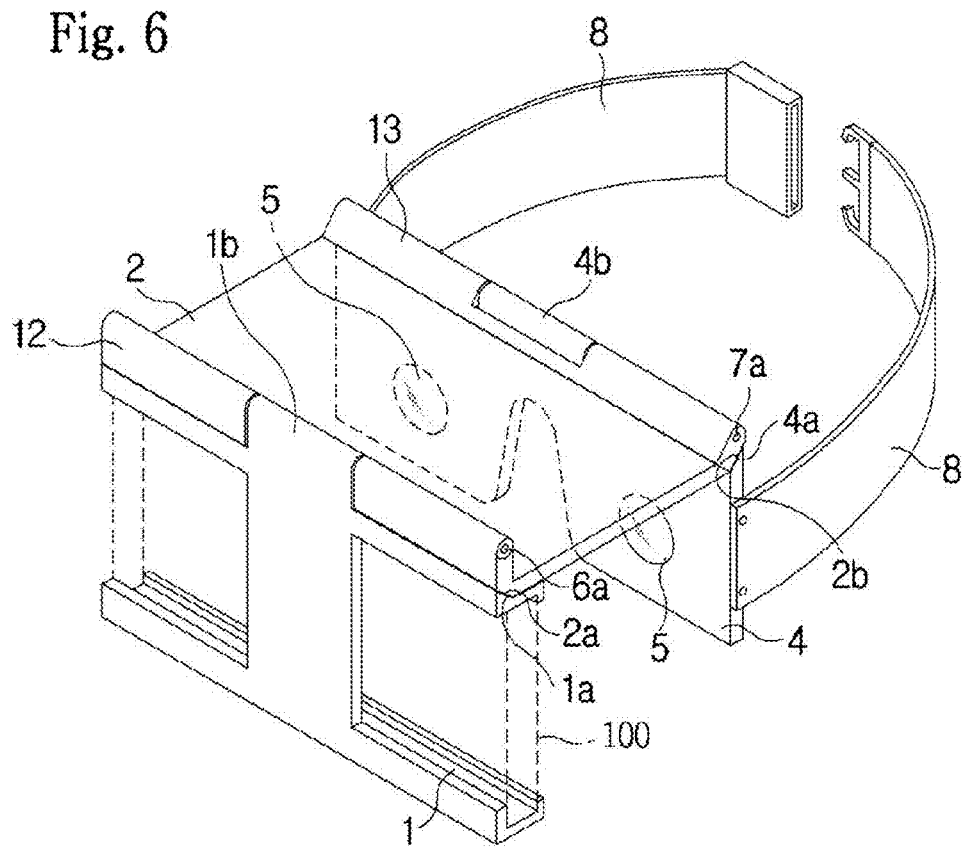

PORTABLE FOLDING VIRTUAL REALITY DEVICE

CROSS-REFERENCE TO RELATED APPLICATION

This application claims priority to Korean Patent Application Nos. 10-2015-0030311, filed on Mar. 4, 2015 in the Korean Intellectual Property Office, which is hereby incorporated by reference in its entirety.

BACKGROUND OF THE INVENTION

This invention relates to a structure of a portable folding virtual reality device of which the weight and volume can be reduced greatly provided with a smart phone.

DESCRIPTION OF THE RELATED ART

The conventional VR device, as shown in FIG. 5(a), is provided with a smart phone therein as a box type for a lens case corresponding to a focus distance of a lens, and it increases the volume thereof not to be portable.

Further, the image control is impossible without an additional control device.

Some of the disclosed conventional 3D observing mirrors are not provided with smart phones and are limited in just devices that can observe simple pictures or photos and thus they are impossible to be applied to virtual reality devices.

Also, there are no functions in a conventional device that formed at a right angle when used so that the lens focus distance and watching distance are unstable to be off focus, making it impossible to be applied to the mobile observing devices such as virtual reality.

SUMMARY OF THE INVENTION

The VR image such as the invention, as shown in FIGS. 1 and 3, is shaped to be fixed to a head of a user as a band and thus when it is heavy and has large volume, it is impossible to use the device and even if used, it is very inconvenient.

Accordingly, the object of the present invention relates to a portable folding virtual reality device which has small volume and is light, and in which the focus distance of the magnifying lens is fixed and the observing image can be controlled from the outsides.

A portable folding virtual reality device of the present invention may include: a cover 2 formed horizontally;

a mounting case 1 which is provided on a front of the cover 2 and on which an image device such as a smart phone is mounted; a lens plate 4 provided with a magnifying lens 5 at a rear of the cover 2; and a band 8 which is connected to both ends of the lens plate 4 and through which the device is mounted to a head of a user wherein the mounting case 1 and the lens plate 4 are arranged to form up and downward at a right angle and to rotate by the cover 2 and a front and rear hinges, a supporting plate 3 that rotates left and rightward with respect to a central line of the cover 2 is further provided, and the interval between the front hinge and the rear hinge is identical to the focal distance of the left and right magnifying lens (5) such that the mounting case 1 and the lens plate 4 are arranged to form a right angle with respect to the cover 2 by the supporting plate 3 and thus the focal distance of the magnifying lens 5 is matched automatically to the image on the mounting case 1 when used and further is folded as a thin film structure when carried.

A first angle supporting plate 1a may be provided on an upper surface of the mounting case 1, a second angle supporting plate 2a may be provided on a front surface of the cover 2, a third angle supporting plate 2b may be provided on a rear surface of the cover 2 and a fourth angle supporting plate 4a may be provided on an upper part of the lens plate 4 wherein the angle of each angle supporting plate 1a, 2a, 2b, 4a is 0-90° such that the mounting case 1 and a front surface of the cover 2 are arranged to form a right angle and the rear surface of the cover 2 and the lens plate 4 are arranged to form a right angle when used and thus the focal distance of the magnifying lens 5 corresponds automatically to a surface of the smart phone 100.

The interval between the front hinge 6 and the rear hinge 7 which are provided below the cover 2 may be identical to the focal distance of the magnifying lens 5.

Both ends of the mounting case 1 may be opened such that the image on the mounting case is controlled by touching the image without an additional controller for the image.

The rotation angle of the front hinge and rear hinges may be 90-180° and the interval between the front hinge 6 and the rear hinge 7, which are provided below the cover 2 may correspond to the focal distance of the magnifying lens 5.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 3 is a view of a portable folding virtual reality device when used, according to the present invention;

FIG. 6 is a view of a portable folding virtual reality device according to a first embodiment of the present invention;

DETAILED DESCRIPTION OF THE INVENTION

Figure 1:
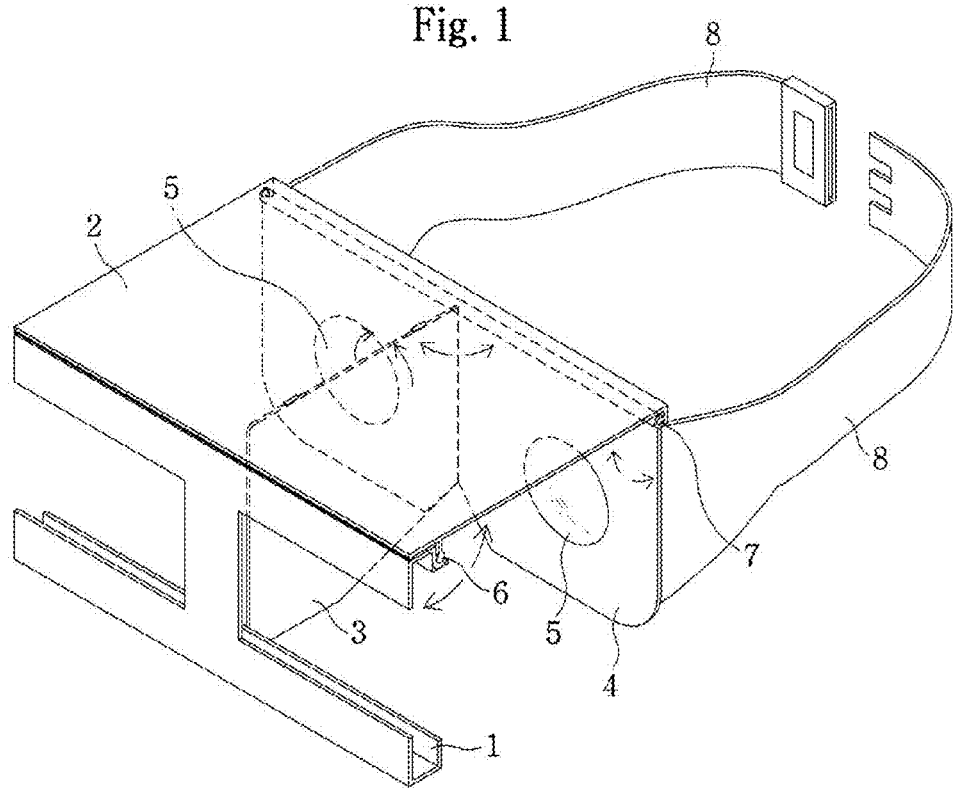
FIG. 1 is a view of a structure of a portable folding virtual reality device according to the present invention.

Exemplary embodiments of the present invention will be described below in detail with reference to the accompanying drawings. Wherever possible, the same reference numerals will be used to refer to the same elements throughout the specification, and a duplicated description thereof will be omitted.

Considering such as above, the portable folding virtual reality device according to the present invention can be thin film structure when carried, the focal distance of the magnifying lens is equally stabilized when used, and can be provided with a structure for a smart phone, on which an image device such as smart phone can be arranged, which is provided with a gyro device and a location tracing device in which a mobile image and the image are varied in accordance with the view angles of up down and left rightward.

Figure 2:
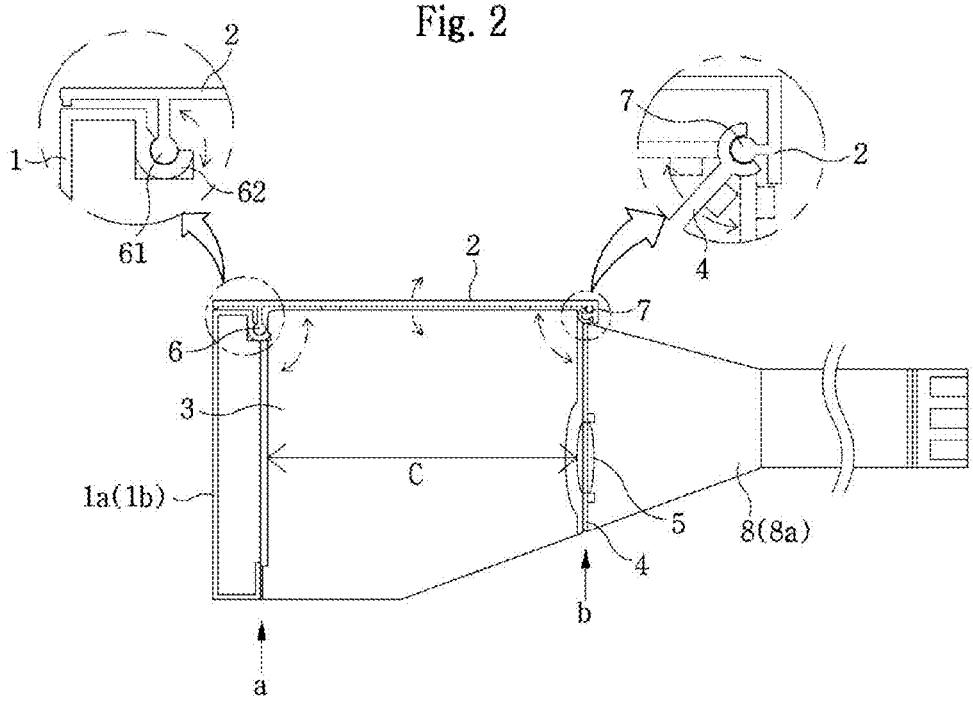
FIG. 2 is a side view of a portable folding virtual reality device according to the present invention.

That is, as shown in FIGS. 1 and 2, the portable folding virtual reality device according to the present invention is provided with: a mounting case 1 on which an image device such as a smart phone is arranged; a cover 2 that consists the upper part together with a hinge 6 on the upper rear part of the mounting case 1: a lens plate 4 connected to a hinge 7 on the rear part of the cover 2; magnifying lens 5 provided at the left and right of the lens plate 4; and a band 8 which is provided at the left and right of the lens plate 4 and used for mounting the portable folding virtual reality device to his/her head by a user.

Further, the lens plate 4 and the mounting case 1 are arranged at a right angle based on their central lines when used, and a supporting plate 3 is provided, which is rotated along a central line of the cover 2 by a supporting plate hinge 10 at a center of the cover when carried, as shown in FIG. 1. The image device mounted as described above needs to be exposed at left and right, the image on which can be controlled from outsides.

Meanwhile, a front hinge 6 and the rear hinge 7 are provided on front and rear surfaces of a main body cover 4, respectively wherein the mounting case 1 is folded to a direction of the cover 2 at a right angle through the front hinge 6 and the lens plate 4 is folded to a direction of the cover 2 at a right angle through the rear hinge 7.

The supporting plate 3 is connected to a hinge 10 along a central line of the cover 2. Here, a smart phone or a tablet personal computer the size of which is similar to that of the smart phone may be mounted on the mounting case 1.

Further, the distance between the front hinge 6 and the rear hinge 7 inside the cover 2, that is, the width of the supporting plate 3 corresponds to the focal distance of the magnifying lens 5 such that a viewer 11 may observe the image on a smart phone mounted on the mounting case 1 through the magnifying lens 5 with the corresponding focal distance of the magnifying lens 5.

In addition, as shown in FIG. 2, the mounting case 1 and the lens plate 4 are arranged in parallel on front and rear surfaces based on the supporting plate 3 when used wherein the mounting case 1 and the lens plate 4 are at a right angle with respect to the supporting plate 3.

Accordingly, the focal distance of the magnifying lens 5 corresponds to the image on the surface of the smart phone mounted on the mounting case 1.

According to the structure of the present invention, as shown in FIGS. 1 and 2, the mounting case 1 on which a smart phone is mounted is unfolded from the cover 2 to be a right angle up and downward and then the lens plate 4 is unfolded to be a right angle up and downward with respect to the cover 2.

Here, the supporting plate 3 rotates at 90° left and rightward around the cover 2 to support the part between the mounting case 1 and the lens plate 4 thereby to keep the mounting case 1 and the lens plate 4 be parallel. Further, the band 8 is provided at both ends of the lens plate 4 to be mounted on a head of a user.

Meanwhile, the distance between the front hinge 6 arranged on a front of the cover 2 and the rear hinge 7 arranged on a rear of the cover 2 is kept to correspond to the focal distance of the magnifying lens 5 by the supporting plate 3 such that the left and right magnifying lens 5 on the lens plate 4 is fixed stably with respect to the image on the smart phone of the mounting case thereby to observe a stable virtual reality image.

Further, according to the structure of the present invention, the front hinge 6 for connecting the cover 2 and the mounting case 1, as shown in FIG. 2, is configured such that one end is formed as a circular ball 61 and the other end is formed as a circular band 62 wherein the circular band 62 is curved at 180° or more, preferably at 180-200° so that the circular band 62 is not separated from the circular ball 61.

The rear hinge for connecting the cover 2 and the lens plate 4 is also configured such that one end is formed as a circular ball and the other end is formed as a circular band, like the front hinge 6, wherein the circular band 62 is curved at 180° or more, preferably at 180-200°.

The front and rear hinges 6, 7 are manufactured by drawing material in a long size, like a pipe process, and then cutting it in a desired size to be assembled simple, and thus it is proper for a hinge structure of thin film and reduces manufacturing cost. However, the structure of the hinges is not limited thereto and other hinge structures such as a hinge for eyeglass may be applied for the structure.

Figure 4A:
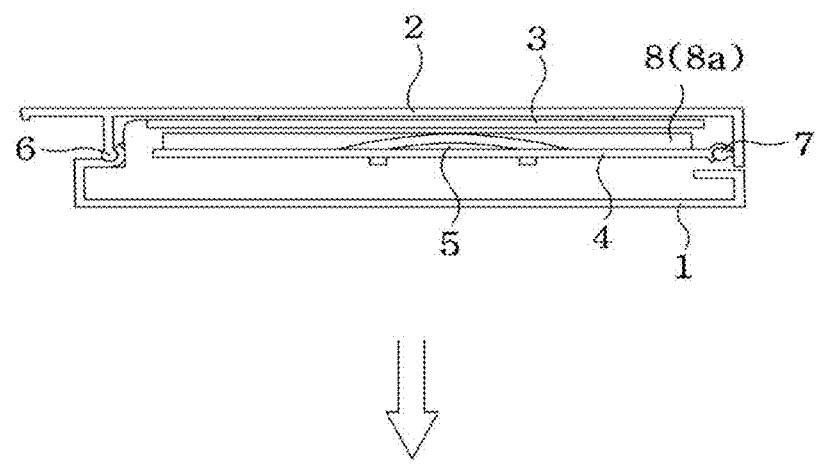
FIGS. 4A and 4B are views of a portable folding virtual reality device which is folded when carried, according to the present invention.
Figure 4B:
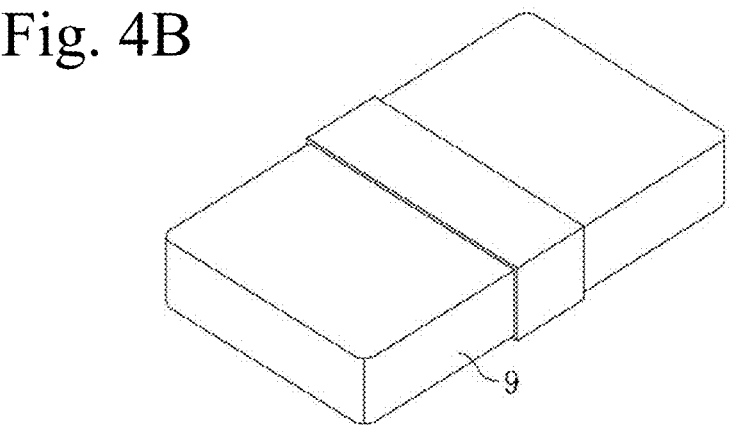

According to the portable folding virtual reality device of the present invention, as shown in FIGS. 4A and 4B, the supporting plate 3 is hinged on the cover 2, and the lens plate 4, the mounting case 1 and the band 8 are folded to form a thin film structure and kept simply in a keeping case 9. Specially, the VR device is seated on a head of a user using the band 8, as shown in FIG. 3, it has to be light and have small volume.

Figure 5A:
FIGS. 5A and 5B are views of comparing a portable folding virtual reality device according to the present invention to a conventional device in size.
Figure 5B:
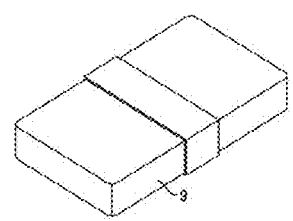

Accordingly, the technical task of the invention is about how small the volume of the portable folding virtual reality device is and how light weight it is and whether the focal distance of the magnifying lens is stably fixed. As shown in FIGS. 5A and 5B, the conventional VR device has volume of 2380 cm$^2$ with 14 cm×17 cm×10 cm in length, width, height and weight of 440 g but under the present invention, the volume is 326 cm$^2$ with 14.5 cm×7.5 cm×3 cm in length, width, height and has weight of below 60 g. That is, the weight and volume is reduced by ¼~⅙ compared to the conventional device, which is convenient in carrying. Therefore, the conventional existing VR devices are inconvenient in carrying but the invention is simply portable.

Also, according to the structure of the conventional VR device the image device such as a smart phone is embedded therein such that the surface of the smart phone is covered, making it impossible to control the image.

However, according to the structure of the portable folding virtual reality device of the present invention, as shown in FIG. 6, the both surface of a smart phone which is mounted on the mounting case 1 are exposed to control the image on the smart phone without an additional control device for the image.

Embodiment 1

The portable folding virtual reality device of the preset invention is structured as followings.

As shown in FIG. 6, a first hinge 1b that is protruded to an upper central part of a mounting case 1 is provided, a second hinge 4b that is protruded to an upper central part of the lens plate 4 is provided, a first protrusion plate 12 is provided on a front of the cover 2 and a second protrusion plate 13 is provided on a rear of the cover 2.

Here, a first angel supporting plate 1a is provided at an oblique angle of 45° to an upper horizontal direction of the mounting case 1 and a second angle supporting plate 2b is provided at an oblique angle of 45° on a front of the cover 2.

Further, a third angle supporting plate 2b is provided at an oblique angle of 45° on a lower part of the second protrusion plate 13 below the rear of the cover 2 and a fourth angle supporting plate 4a is provided at an oblique angle of 45° to an upper horizontal direction of the lens plate 4. Here, the lengths of the front and rear surfaces of the cover 2 are configured such that the focal distance of the magnifying lens 5 of the lens plate 4 corresponds to the focal distance of a smart phone 100 to be mounted on the mounting case 1.

Figure 7A:
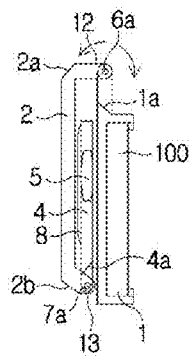
FIG. 7A is a view of a portable folding virtual reality device when carried according to a first embodiment of the present invention.
Figure 7B:
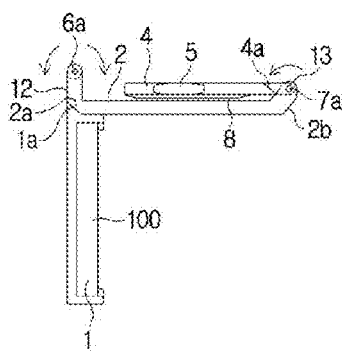
FIG. 7B is a view of a portable folding virtual reality device when deployed and operated according to a first embodiment of the present invention.
Figure 7C:
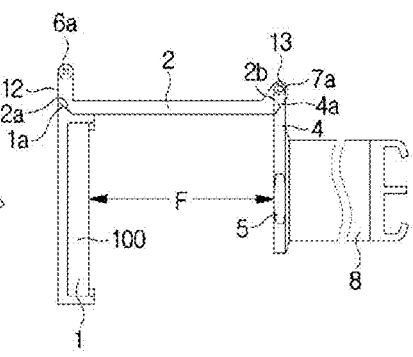
FIG. 7C is a view of a portable folding virtual reality device when deployed according to a first embodiment of the present invention.

The cover 2 and the lens plate 4 connected to a rear of the cover 2, as shown in FIG. 6, are rotated frontward by the first hinge 1b with respect to the mounting case 1, as shown in FIGS. 7A, 7B, 7C.

At this time, as shown in FIG. 7B, the first angle supporting plate 1a provided at an oblique angle of 45° on an upper part of the mounting case 1 and the second angle supporting plate 2a provided at an oblique angle of 45° on a front of the cover 2 are meshed with each other to be supported firmly at an right angle.

When the structure as shown in FIG. 7B rotates rearward to be deployed, as shown in FIG. 7C, the third angle supporting plate 2b provided at an oblique angle of 45° on a rear of the cover 2 and the fourth angle supporting plate 4a provided at an oblique angle of 45° on an upper part of the lens plate 4 are meshed with each other to form accurately a right angle and the second protrusion plate 13 and the second hinge 4b are meshed with to be supported firmly at a right angle.

For example, in more detail, if the first angle supporting plate 1a and the third angle supporting plate 2b are arranged to be an angle of 45°, the second angle supporting plate 2b and the fourth angle supporting plate 4a are arranged to be an angle of 45° and thus the sum of interior angles of the first angle supporting plate 1a and the second angle supporting plate 2a becomes 90° and the sum of interior angles of the second angle supporting plate 2a and the fourth angle supporting plate 4a becomes 90°.

In same principle, if the first angle supporting plate 1a and the third angle supporting plate 2b are arranged to be an angle of 30°, the second angle supporting plate 2a and the fourth angle supporting plate 4a are arranged to be an angle of 60°, and if the first angle supporting plate 1a and the third angle supporting plate 2b are arranged to be an angle of 0°, the second angle supporting plate 2a and the fourth angle supporting plate 4a are arranged to be an angle of 90°

That is, in any cases, the sum of interior angles of the first angle supporting plate 1a and the second angle supporting plate 2a and the sum of interior angles of the third angle supporting plate 2b and the fourth angle supporting plate 4a become 90°.

Figure 8:
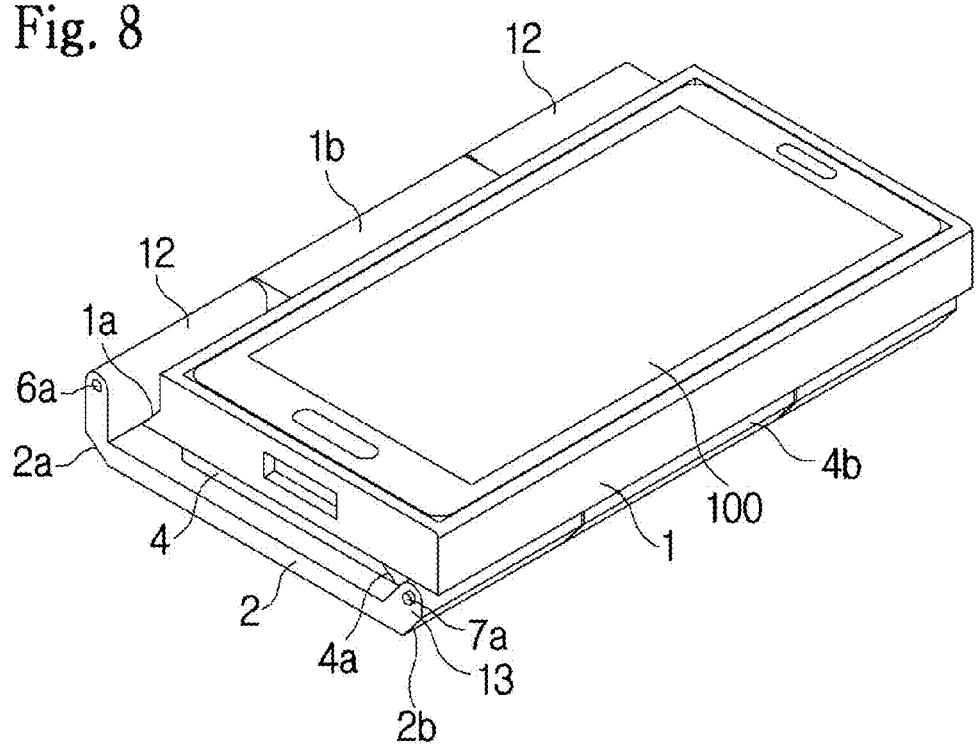
FIG. 8 is a view of is a view of a portable folding virtual reality device when it is applied to a smart phone according to a first embodiment of the present invention.

When the portable folding virtual reality device of the present invention is folded and carried, it is folded as a thin film form as shown in FIG. 8 in a reverse order of FIGS. 7A, 7B, 7C, such that the cover 2, the lens plate 4 and the band 8 are folded with respect to the mounting case 2 and thus the smart phone 100 mounted in the mounting case 1 is exposed outside.

That is, the smart phone is mounted in the mounting case 1 when the device is folded and carried, as shown in FIG. 7A, used as a smart phone as shown in FIG. 8, and deployed as shown in FIGS. 7A, 7B, 7C and used as a virtual reality device as shown in FIG. 6.

In the virtual reality device as described above, the focal distance of the magnifying lens 5 of the lens plate 4 is fixed stably and accurately to the location of the smart phone 100. Accordingly, according to the present embodiment of the present invention the length of the cover corresponds to the focal distance of the magnifying lens 5 when it is used as a virtual reality device.

Further, as shown in FIGS. 6 and 7C, when the portable folding virtual device is deployed and used, a front surface of the mounting case 1 and the cover 2 are fixed stably at a right angle and a rear surface of the mounting case 1 and the cover are fixed stably at a right angle so that the focal point of the lens is not shaken thereby to observe the virtual reality image wherein a user may seat the device on his/her head by using the band 8 to view the image while he/she returns up and downward and left and rightward.

Accordingly, a length of a front surface of the mounting case 1 has to be identical to the length F of the cover 2 corresponding to the interval of the magnifying lens 5.

Further, the first angle supporting plate 1a of the mounting case 1 and the second angle supporting plate 2a at a front of the cover 2 are meshed with each other symmetrically and in parallel at 45° to form a right angle, the third angle supporting plate 2b a rear of the cover 2 and the fourth angle supporting plate 4a at an upper surface of the lens plate 4 are meshed with each other symmetrically and in parallel at 45° to form a right angle.

As described above, the interior angle sum of the first angle supporting plate 1a and the second angle supporting plate 2a becomes 90° and the interior angle sum of the third angle supporting plate 2b and the fourth angle supporting plate 4a becomes 90°.

That is, for example, when the first angle supporting plate is 30°, the second angle supporting plate is 60°, and when the third angle supporting plate is 0°, the fourth angle supporting plate is 90. That is, the first angle supporting plate 1a and the second angle supporting plate 2a is 0 to 90° and the third angle supporting plate 2b and the fourth angle supporting plate 4a is 0 to 90° such that each interior angle sum thereof becomes 90°.

The reason for maintaining the interior angle sum to be 90° is because the focal interval F between the magnifying lens 5 and the image on the smart phone 100 is kept stably and constantly.

Further, as shown in FIG. 6, the first protrusion plate 12 and the first hinge 1b are meshed with each other and the second protrusion plate 13 and the second hinge 4b are meshed with each other to keep firmly the right angle structure.

In addition, as shown in FIG. 7C, the length F of the cover 2 is identical to the focal distance of the magnifying lens 5 to match automatically the focal point.

Accordingly, according to the present invention the weight and volume of the device is reduced by ¼-⅙ compared to conventional device to be convenient in carrying and further the hinge structure is suitable to the thin film structure. The image on the mounting case and the magnifying lens 5 of the lens plate 4 are arranged at a right angle by the cover 2 and the supporting plate 3 when used such that the focal point of the magnifying lens 5 is matched uniformly and automatically to the image surface.

According to the present invention, it is characterized in that an image device such as a smart phone provided with a location tracing device and gyro device, a belt structure provided left and rightward on the lens plate and the left and right sides of a virtual devices are exposed. Further, the mounting case and the lens plate are folded inward with respect to the cover thereby to reduce the volume by ¼ compared to the conventional devices and the weight is also reduced by ¼ compared to the conventional devices, which minimize the inconvenience of use when worn for long times.

Meanwhile, the mounting case and the lens plate are connected to the rotating supporting plate to maintain stably the focal distance of the lens and the image and the surface of the image is exposed to the left and right sides of the supporting plate such that a user can control the image by using both hands without an additional controller for the image.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A portable folding virtual reality device comprising:
   a cover formed horizontally;
   a mounting case which is provided on a front of the cover and on which an image device such as a smart phone is mounted;
   a lens plate provided with a magnifying lens at a rear of the cover; and
   a band which is connected to both ends of the lens plate and through which the device is mounted to a head of a user wherein the mounting case and the lens plate are arranged to form up and downward at a right angle and to rotate by the cover and a front and rear hinges, a supporting plate that rotates left and rightward with respect to a central line of the cover is further provided, and the interval between the front hinge and the rear hinge is identical to the focal distance of the left and right magnifying lens such that the mounting case and the lens plate are arranged to form a right angle with respect to the cover by the supporting plate and thus the focal distance of the magnifying lens is matched automatically to the image on the mounting case when used and further is folded as a thin film structure when carried,
   wherein a first angle supporting plate is provided on an upper surface of the mounting case, a second angle supporting plate is provided on a front surface of the cover, a third angle supporting plate is provided on a rear surface of the cover and a fourth angle supporting plate is provided on an upper part of the lens plate wherein the angle of each angle supporting plate is 0-90° in which the sum of interior angles thereof becomes 90° when the first angle supporting plate and the second angle supporting plate are connected each other, and the sum of interior angles thereof becomes 90° when the third angle supporting plate and the fourth angle supporting plate are connected each other such that the mounting case and a front surface of the cover are arranged to form a right angle and the rear surface of the cover and the lens plate are arranged to form a right angle when used and thus the focal distance of the magnifying lens corresponds automatically to a surface of the smart phone.

2. The portable folding virtual reality device of claim 1, wherein the rotation angle of a circular band with respect to a circular ball in each first and second hinge is 90-180°.

3. The portable folding virtual reality device of claim 1, wherein the interval between the front hinge and the rear hinge which are provided below the cover is identical to the focal distance of the magnifying lens.

4. The portable folding virtual reality device of claim 1, wherein both ends of the mounting case are opened such that the image on the mounting case is controlled by touching the image without an additional controller for the image.

5. The portable folding virtual reality device of claim 1, wherein the band is arranged to the left and right ends of the lens plate through which the mounting case is mounted on a head of a user.

* * * * *